Nov. 20, 1962 S. E. WAHLSTRÖM 3,065,312

MULTI-TRANSDUCER HEAD WITH SPACED TAPE GUIDE

Filed Feb. 1, 1960 2 Sheets-Sheet 1

Nov. 20, 1962 S. E. WAHLSTRÖM 3,065,312

MULTI-TRANSDUCER HEAD WITH SPACED TAPE GUIDE

Filed Feb. 1, 1960 2 Sheets-Sheet 2

United States Patent Office 3,065,312
Patented Nov. 20, 1962

3,065,312
MULTI-TRANSDUCER HEAD WITH SPACED TAPE GUIDE

Sven Erik Wahlström, Enskede, Sweden, assignor to Aktiebolaget Atvidabergs Industrier, Atvidaberg, Sweden, a joint-stock company of Sweden Filed Feb. 1, 1960, Ser. No. 5,874
Claims priority, application Sweden Feb. 3, 1959
7 Claims. (Cl. 179—100.2)

The present invention concerns an arrangement for magnetic heads and similar devices which are intended for recording and reading out data to or from a tape shaped record.

The main object of the invention is to obtain a recording and analysing device, which is particularly reliable with regard to the absence of false signals etc., because it is insensible to the influence of grains of dust and similar small particles, which possibly can penetrate between the preferably tape shaped record and the magnetic head or between the record and a support cooperating with the magnetic head.

This and other objects are attained by means of the device according to the invention, which includes a head having at least one transducer portion and a tape support for holding the record medium in immediate proximity to the head, leaving a slot for said medium the width of which is determined by positioning means, characterized in that the head is provided with grooves on either side of each transducer portion while the support is provided with grooves opposite to each transducer portion, the ribs remaining between said last mentioned groves being located opposite to said first mentioned grooves.

The accompanying drawings illustrate schematically and as an example an embodiment of the invention.

Figure 1:
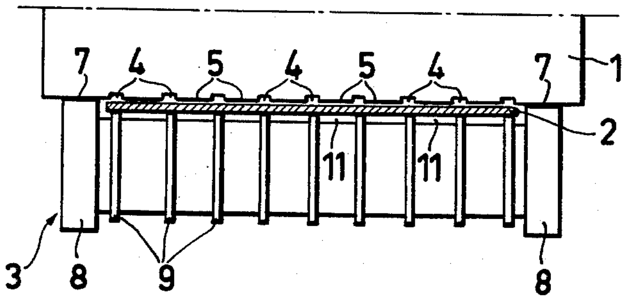
FIG. 1 is a sectional view of the magnetic head and the support in accordance with the invention.

In FIG. 1, 1 designates the front portion of the magnetic head schematically illustrated, 2 designates the record medium, which in the embodiment shown is a magnetic tape, and 3 designates the support in accordance with the invention. Nine slots 4 are cut in that surface of the magnetic head 1 which is turned towards the magnetic tape 2, and eight individual recording surfaces 5 are formed between said slots 4 cooperating with eight recording channels on the tape 2 corresponding to said surfaces. Outside the two outermost slots 4 the magnetic head 1 is provided with two supporting surfaces 7.

The support, which is generally designated by 3 is substantially cylindrical in the embodiment shown and consists of a segment of a circular cylinder which is provided firstly with two projections or wider portions 8 which are located at the ends of the support just opposite the two supporting surfaces 7 of the magnetic head and adapted to rest against said supporting surfaces in the active position of the support, and is provided secondly with nine ribs 9.

Both the projections 8 and the ribs 9 consist of circular cylindrical segments which are coaxial both mutually and with the rest of the support.

In the device according to the invention a slot is formed between the magnetic head 1 and the support 3, through which the magnetic tape 2 passes. In this connection it should be mentioned that the width of this slot as well as the thickness of the magnetic tape 2 are greatly exaggerated in FIG. 1 in order to make this figure as clear as possible.

Because of the shape of the support, spaces 11 are formed everywhere between the tape 2 and the support 3 in front of the recording surfaces 5, and by means of these spaces grains of dust and the like which may penetrate into the slot between the magnetic tape 2 and the support 3 are prevented from locally pressing the tape against the magnetic head 1 so that false signals are generated. Moreover the spaces 11 guaranteed that grains of dust and the like which possibly may enter between the magnetic head 1 and the tape 2 do not cause any scores in the latter when it is passing the magnetic head, as the tape 2 easily can bend towards the support 3 into said spaces 11.

The slots 4 are preferably wider than the thickness of the ribs 9 plus twice the thickness of the tape.

Figure 2:
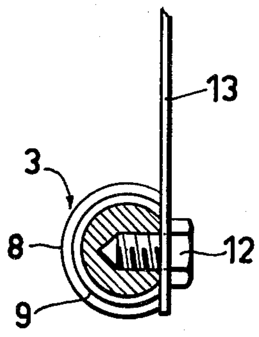
FIG. 2 is a cross section through the support.
Figure 3:
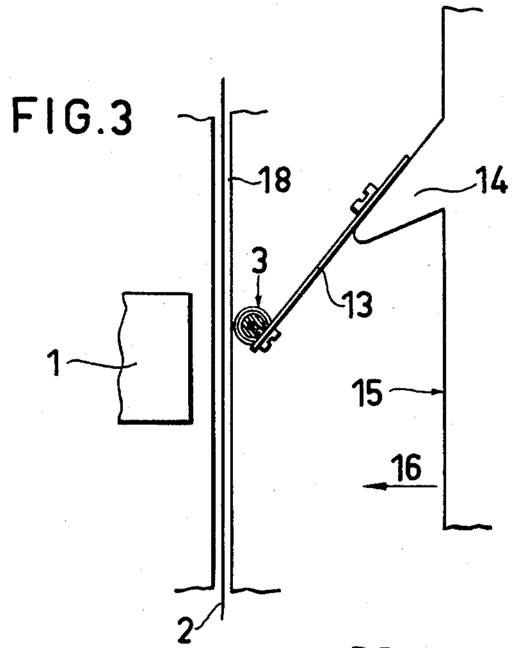
FIG. 3 is a sectional view of the magnetic head, the support and the parts cooperating therewith and shows how the support is attached to a movable carriage by a resilient device.
Figure 4:
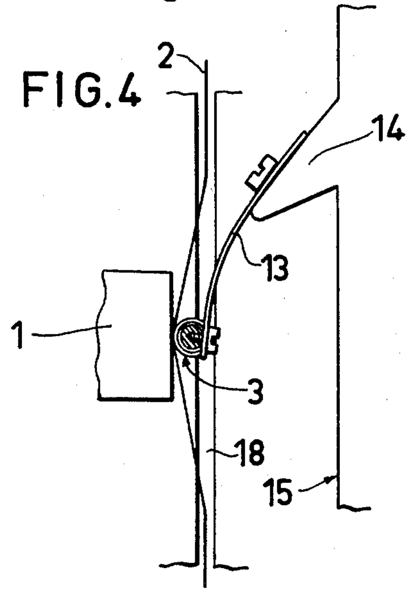
FIG. 4 is a sectional view corresponding to FIG. 3 showing the support in another position.

The support 3 is by means of a screw 12 (FIG. 2) fastened to a leaf spring 13, which in its turn is screwed on a projection 14 of a carriage 15, which is movable both in the direction of the arrow 16 (FIGS. 3 and 4) and in the opposite direction back to the inactive position. To the lower end (not shown) of the magnetic tape 2 is attached a weight (not shown) which runs in and is guided by a track 18. The magnetic tape 2 preferably runs over idlers (not shown) which are placed above and below the magnetic head 1.

When the carriage 15 is displaced in the direction of the arrow 16, the support 3 brings the tape 2 towards the magnetic head 1. During the later part of this movement, when the projections 8 have come into contact with the supporting surfaces 7, the support 3 slides downwards on said surfaces while rotating around its longitudinal axis (compare FIGS. 3 and 4), at the same time as the spring is bent.

The contact point between each projection or wider portion 8 and the supporting surface 7 is consequently moving along a curve on the projection 8 and along a straight line on the contact surface 7. In this way one and the same point is prevented from being subject to the whole contact pressure, which instead is gradually applied while the contact point moves, and at the same time dirt possibly collected on the supporting surfaces 7 is automatically removed during this movement of the support. Even if the projections 8 should strike so heavily against the supporting surfaces 7, at the movement of the carriage 15 in the direction of the arrow 16, that a certain local deformation arises in the supporting surface 7 or the projection 8 (the manufacturing tolerances of which are of the magnitude of some $\mu$) this has no importance as the parts of the supporting surfaces 7 and the projections 8 which are active during the recording and analyzing process are not the same as the possibly deformed parts, because of said sliding and rotating motion.

The embodiment described above and shown in the drawings is of course to be considered only as a nonlimiting example and it can be modified as to its details in many ways within the scope of the following claims. For example, it is not necessary that the tape 2 is a magnetic one but it could instead be e.g. a ferro-electric or perforated one, in which case the magnetic head 1 of course must be replaced by a recording and analyzing head corresponding to the tape 2.

Further one of the projections 8 can be dispensed with and the tape may be replaced by a flat disc which can be rotated in the slot between the magnetic head 1 and the support 3 around an axis perpendicular to the active surface of the recording head.

What I claim is:

1. A transducer structure for recording and/or reproducing signal records of flat configuration, comprising a transducer head including at least one transducer surface portion extending in the direction of record motion, said head having grooves lying to either side of said surface portion and extending in the same direction; a record supporting and guiding member positioned opposite the said transducer head to define therewith a channel for the passage of the record over said transducer surface, said member having at least a pair of ribs extending generally in said direction and positioned to overlie said grooves; and cooperating abutment formations on said head and said member, dimensioned to maintain a specified minimum separation between said surface portion and said ribs, to accommodate a record with a predetermined minimum clearance when said head and said member are in their position of closest approach.

2. A transducer structure in accordance with claim 1, in which the width of said grooves in the direction transverse to the direction of record motion is at least equal to the width of said ribs plus twice the thickness of the record.

3. A transducer structure in accordance with claim 1, in which there are a plurality of said transducer surface portions and a corresponding plurality of sets of such grooves and ribs.

4. A transducer structure in accordance with claim 1, in which said member and said ribs have surfaces which are cylindrically curved about an axis transverse to the direction of record motion.

5. A transducer structure in accordance with claim 4, including spring means mounting said member for composite motion toward and away from said head and simultaneously in the direction of record travel, to effect a wiping contact between said cooperating abutment formations.

6. A transducer structure in accordance with claim 1, in which said head and said member are supported for resilient wiping engagement of said cooperating abutment formations when the parts are moved towards one another.

7. A transducer structure in accordance with claim 6, in which the abutment formations of said member are cylindrically curved about an axis transverse to the direction of record motion.

References Cited in the file of this patent

UNITED STATES PATENTS

| | | |
|---|---|---|
| 2,644,690 | Krag | July 7, 1953 |
| 2,819,349 | Hall | Jan. 7, 1958 |

FOREIGN PATENTS

| | | |
|---|---|---|
| 1,036,528 | Germany | Aug. 14, 1958 |